Feb. 1, 1949.  S. CALVERT  2,460,411
SOUND RECORDER
Filed March 9, 1944
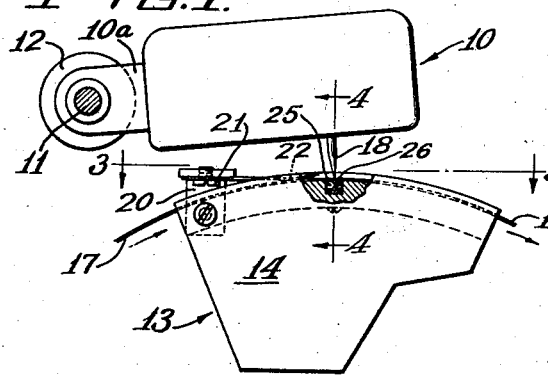
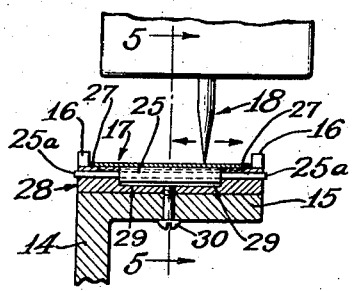
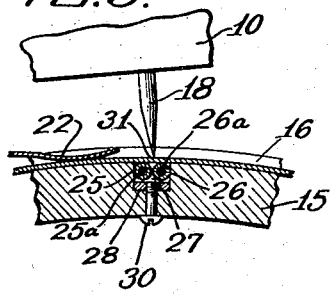
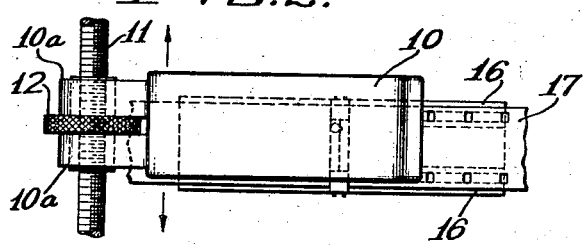
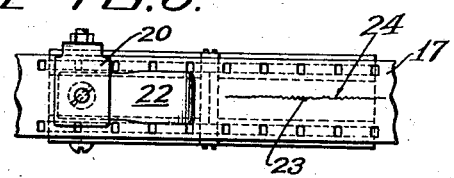
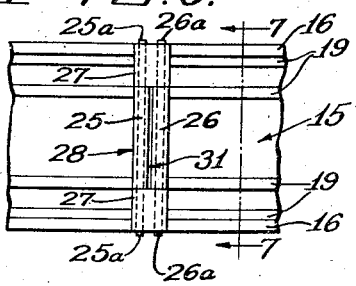
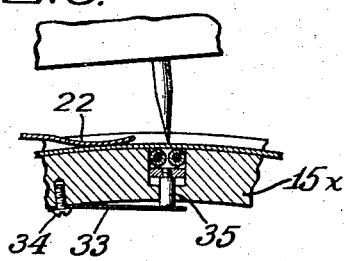
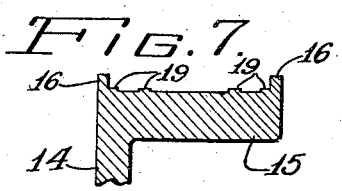
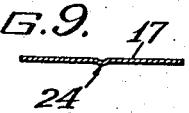
Inventor:
Sumter Calvert
By Allen Kinnan
Attorney Patented Feb. 1, 1949

2,460,411

UNITED STATES PATENT OFFICE 2,460,411

SOUND RECORDER

Sumter Calvert, Chicago, Ill., assignor to
Raymond T. Moloney, Chicago, Ill.

Application March 9, 1944, Serial No. 525,781

4 Claims. (Cl. 274—11)

This invention relates to sound recording and transcribing on film substances, such as motion picture film and analogous tape, band, or strip materials, by means of a stylus bearing on the film and vibrated in accordance with the sound impulses to be recorded.

The invention is particularly applicable to that type of stylus recording in which the stylus is vibrated laterally of the direction or length of the sound track or groove formed by the stylus as the film is passed therebeneath.

A principal object of the invention is the provision of an improved sound head structure including roller means over which the film passes beneath the stylus with greatly reduced frictional retarding effects on the film, and particularly contrived to permit complete freedom of movement of the stylus in lateral, or other, recording motions thereof, while at the same time affording a space beneath the film and opposite the stylus point for displacements of the film substance which result either from recording movements of the stylus or the pressure of the stylus on the film as the latter passes therebeneath.

A further object is the provision of a recording bed adapted to reduce the drag on the film moving thereover, to afford a minimum resistance to the recording motions of the stylus point; to permit movement of the stylus to any position between the opposite edges of the film, so that a plurality of sound tracks may be made on a single film; to provide a space on the underside of the film for displaced portions of the film caused by actions of the stylus thereon at any position across the width of the film band; to reduce noise and background effects by maintaining the film in a relatively firm position beneath the stylus for normal movements of the film, while permitting the film to yield in a direction away from the stylus for clearance of patches or irregularities in film thickness, all without introducing objectionable drag on the film.

Viewed from another aspect, it is an object of the invention to provide a recording bed for a sound head in which anti-friction members support the film firmly beneath the stylus in a relationship to engage the underside of the film closely on opposite sides of the stylus with respect to the direction of travel of the film, and in such proximity as to afford a trough on the underside of the film remote from the point of the stylus and into which the film body is not depressed, but which leaves the film substantially unsupported at this point for purposes hereinabove set forth.

Other objects, advantages, and aspects of novelty and economy peculiar to the invention relate to details of construction and operation of the embodiment hereinafter described in view of the annexed drawing in which:

Fig. 1 is a side elevation, partly in section, showing the novel sound head;

Fig. 2 is a top plan view of the structure shown in Fig. 1;

Fig. 3 is a top plan view of the film track, looking in the direction of lines 3—3 in Fig. 1;

Fig. 4 is a vertical, lateral, section through the film bed, showing the recording unit in fragmentary elevation, as viewed in the direction of lines 4—4 of Fig. 1;

Fig. 5 is a fragmentary longitudinal section through the film bed, with portions of the recording unit shown in elevation, looking in the direction of lines 5—5 of Fig. 4;

Fig. 6 is a top plan view, to enlarged scale, of a portion of the film bed or track and the sound bed therein;

Fig. 7 is a lateral, vertical section through the film track or bed taken along lines 7—7 of Fig. 6;

Fig. 8 is a vertical longitudinal fragmentary section, similar to Fig. 5 and showing a modified form of the sound bed;

Fig. 9 is a magnified cross sectional view of the film showing one of the sound grooves or tracks embossed therein by the sound stylus.

The sound head as illustrated in Fig. 1 includes a sound translating device 10 of known construction adjustably carried on a transverse micrometer-thread spindle 11, there being a travelling nut 12 between yoke arms 10a threadably engaging the spindle, and adapted, when manually rotated, to effect transverse shifting of the head 10 in the directions of the arrows at the left of Fig. 2, for purposes hereinafter alluded to.

Beneath the recording unit 10 is a film bed (Fig. 1) consisting of a casting 13 including a vertical plate portion 14 and an arcuate horizontal film track portion 15 (Fig. 4), and along the opposite marginal sides of the track 15 extend flanges 16 between which the film 17 travels, as in Figs. 2, 3, and 4, with the stylus 18 of the recording unit resting on the upper surface of said film.

As shown more particularly in Fig. 7, the bottom of the film bed is provided with a number of spaced ribs or tracks 19 adapted to underlie the film and afford substantial support therefor while at the same time reducing the overall surface contact area between film and bed so as to impede the feeding movement of the film as little as possible.

Carried on the casting 13 is a bracket 20 to which is secured by screw means 21 a spring presser arm 22 (Figs. 1, 3, 5) which presses lightly but positively down upon the upper face of the film just behind the stylus point for the purpose of holding the film in the bed.

Recording means, such as the unit 10, are well understood in the art, and of several varieties, so that detailed specification of the construction thereof is deemed unnecessary.

In one form of recorder 10 well known in the art and considered suitable for use with the present invention, the stylus 18 is caused to vibrate laterally, in the direction of the arrows in Fig. 4, to the direction of travel of the film therebeneath, so as to form a sound groove 23 of the wavy pattern shown to greatly exaggerated scale on the film fragment 17 of Fig. 3. The pressure of the stylus point forms what is herein termed an embossed groove 24 (Fig. 9) lengthwise of the film, in addition to the lateral sound patterns exemplified at 23, and it is pointed out that this groove 24 is the result of downward displacement of the film material at the point of contact of the stylus, and is to be distinguished from a groove such as would be formed by a cutting action of the stylus.

Any cutting or rupturing of the film surface by the stylus is considered objectionable, mainly because the resulting cut gives rise to scraping noises on the play-back, and tends to weaken the film, in addition to increasing the resistance to film travel beneath the stylus, and while the invention is also useful in conjunction with the cutting type of recorder, it is considered preferable to adjust the stylus point to press into the film without scratching, cutting, or rupturing its surface.

It will appear therefore that in the preferred method of cutting the sound track according to the present invention, no actual cutting of the film occurs, the term being used in the general sense familiar in the art to denote the formation of any sound track by means of a stylus or the like; and it will further appear that the recording according to the present means and method results in a displacement of portions of the film substance on the underside of the film, as in Fig. 9.

Means providing a recording bed for the film beneath the stylus comprises a pair of rollers 25 and 26 (Fig. 6), each provided with small pin shafts 25a and 26a, respectively, and journaled in opposite end blocks 27 of a mounting member 28, formed of brass or other suitable bearing material, and cut away in its central portions to receive the rollers, as at 29, the mounting member being fitted into a slot formed transversely in the horizontal section 15 of the casting 13, and being secured in position by means such as the screw 30, Figs. 4, 5, and 6.

Preferably, the rollers 25 and 26 should not exceed one-eighth of an inch in diameter, and they should be glass-hardened and provided with a high polish. The rollers are set in the mounting member 28 to rotate freely and in close proximity, with their respective shafts or rotational axes disposed approximately in a plane which is nearly parallel with that of the section of film passing thereover.

Such a disposition of the rollers 25 and 26 provides a space or trough 31, Fig. 5, particularly, which is situated just below the point of the stylus, so that the film is supported firmly at opposite sides of the stylus point, with regard to the direction of movement of the film, but is in effect unsupported in the region just beneath the stylus point; and since the said space or trough 31 extends transversely of the film for the length of the rollers, it will appear that the stylus may be positioned at any point across the width of the film, it being preferred usually, however, to leave a margin at the opposite sides of the film where the feeding perforations appear, at which no sound track will be formed, such marginal portions of the film being supported by the ribs or tracks 19.

Very satisfactory results are obtained in the embodiment shown when the point of the stylus is set slightly in advance (with regard to the direction of movement of the film, that is from left to right in Fig. 5, for example) of a tangent assumed common to both rollers and extending upwardly toward the stylus; and further, if the stylus is set to enter the film to a depth of something less than one-half the thickness thereof; it being further recommended for best results that the stylus point be adapted not to cut into, or scratch the film, but rather to form a polished groove therein, to eliminate noises and drag.

In applications of the invention where considerable patching of the film may be expected, thereby giving rise to bumps or irregularities in film thickness, or where different makes or types of film will be used, involving similar variations in thickness, it is preferred to employ the modification illustrated in Fig. 8, wherein a sound bed identical to the roller means 25, 26, 28 of Fig. 5, is yieldably mounted in the film bed. To this end, the roller mounting 28x is provided with a somewhat deeper cross slot 32 in the casting than is the case in the embodiment of Fig. 5; and a spring member 33, secured to the underside of the horizontal part 15x of the casting, as at 34, bears upwardly against a pin 35 engaging the bottom of the mounting block for the rollers, whereby the latter are urged toward the underside of the film, but may yield downwardly should a patch or other thickness irregularity pass beneath the stylus.

The embodiment of Fig. 8 provides a floating roller means which, in addition to the functions heretofore described, also affords advantages in recording reaction with the stylus where for any reason the lateral recording vibrations of the stylus may tend to be slightly arcuate with a tendency to lift the stylus away from the film, in effect.

The closely proximity of the roller means 25, 26 provides firm support for the film, adequate to prevent downward buckling thereof, notwithstanding that space is left beneath the point of the stylus for the downward displacement of film in the formation of the running track or groove, as illustrated in the sectional view of film shown in Fig. 9; and in addition, there is less impedance to the lateral recording motions of the stylus, resulting in recordings of higher fidelity and clarity, with less noise and less drag on the film, than is the case with certain prior recording means of this general class.

It is to be understood that the foregoing construction is entirely suitable for use in transcribing, in which case, a conventional pick-up or transcribing unit would replace the recording unit 10, or the latter may be a dual recorder and transcriber of known construction.

It is not intended that the foregoing specifications be construed as limitations upon the invention, excepting as may be expressly provided by the appended claims, namely:

1. Sound apparatus including means providing a firm support over which film is adapted to move, rotatable members movably mounted on said support extending laterally of the movement of said film and over which said film is adapted to move, said members being movable toward and away from the plane of the film, and a sound stylus positionable upon said film at points across its width and between said rotatable members on a side of the film opposite from the latter.

2. Sound recording apparatus including a support over which a recording medium of thin deformable character is adapted to be passed, a sound stylus positionable upon said medium on said support, and a unit resiliently mounted on said support including a plurality of revoluble members for engaging a side of said medium confronting said support, said revoluble members being spaced apart in the direction of movement of the medium over the support at points closely adjacent the point of engagement of said stylus with the medium but on opposite sides of the stylus in said direction.

3. In a sound head, in combination, a pair of elongated revoluble members extending in close parallelism forming an elongated trough therebetween and over which film is adapted to be moved, a sound unit including a stylus positionable upon said film to engage said film above said trough, means for mounting said revoluble members for movement as a unit toward and away from the plane of said film, means yieldably urging said mounting means in a direction toward said stylus, and means for shifting said sound unit transversely of said film whereby to selectively position said stylus at points along said trough.

4. Sound apparatus including a film bed, a mounting member removably seated in said bed beneath the travel of film thereof, said mounting member being movable in said bed toward and away from the plane of the film, means yieldably urging said mounting member toward said film, a pair of rollers seated for free rotation in close parallelism in said mounting member which extend transversely of said film and over which said film is adapted to travel, and a sound actuated stylus engageable with said film above said rollers and along a line across the film beneath which there is no peripheral contact between said rollers and film, said line further lying inwardly of the axes of said rollers so as to be between said axes.

SUMTER CALVERT.

REFERENCES CITED

The following references are of record in the file of this patent:

UNITED STATES PATENTS

| Number | Name | Date |
| --- | --- | --- |
| 1,853,966 | Eckert | Apr. 12, 1932 |
| 1,947,290 | Fonda | Feb. 13, 1934 |
| 2,188,687 | Lohn | Jan. 30, 1940 |
| 2,205,058 | Calvert | June 18, 1940 |
| 2,255,232 | Stern | Sept. 9, 1941 |

FOREIGN PATENTS

| Number | Country | Date |
| --- | --- | --- |
| 134,006 | Austria | July 10, 1933 |
| 156,216 | Great Britain | Apr. 3, 1922 |